US011528301B1

(12) United States Patent
Saraf et al.

(10) Patent No.: US 11,528,301 B1
(45) Date of Patent: Dec. 13, 2022

(54) SECURE EMBEDDING OF PRIVATE CONTENT VIA A DYNAMICALLY-SET SECURITY POLICY

(71) Applicant: Amazon Technologies, Inc., Seattle, WA (US)

(72) Inventors: Rahul Kishore Saraf, Seattle, WA (US); Prasad Renake, Seattle, WA (US); Joseph Jabril Hooper, Seattle, WA (US); Prabhu Shanmukham Ganesh, Seattle, WA (US); Vinothkumar Narasimhan, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 16/917,560

(22) Filed: Jun. 30, 2020

(51) Int. Cl.
*H04L 9/40* (2022.01)
*G06F 21/62* (2013.01)
*H04L 65/60* (2022.01)
*H04L 67/02* (2022.01)

(52) U.S. Cl.
CPC ............ *H04L 63/205* (2013.01); *G06F 21/62* (2013.01); *H04L 63/102* (2013.01); *H04L 63/108* (2013.01); *H04L 65/60* (2013.01); *H04L 67/02* (2013.01)

(58) Field of Classification Search
CPC ................................ H04L 63/205; G06F 21/62
See application file for complete search history.

(56) References Cited

U.S. PATENT DOCUMENTS

| 11,252,194 | B2 * | 2/2022 | Kipp ....................... H04L 63/20 |
| 2015/0339461 | A1 * | 11/2015 | Min ........................ H04W 4/80 |
| | | | 726/28 |
| 2021/0377272 | A1 * | 12/2021 | Dasari ................... H04L 63/102 |

OTHER PUBLICATIONS

AWS, "Amazon AppStream 2.3—Administration Guide", API version Dec. 1, 2016, Updated Jun. 10, 2021, pp. 1-362.
"Content Security Policy (CSP) Quick Reference Guide", Retrieved from https://content-security-policy.com on Apr. 2, 2020, pp. 1-10.
(Continued)

*Primary Examiner* — Esther B. Henderson
(74) *Attorney, Agent, or Firm* — Robert C. Kowert; Kowert, Hood, Munyon, Rankin & Goetzel, P.C.

(57) ABSTRACT

Disclosed are system architectures and techniques for securely embedding private content via dynamically-set security policy. A streaming service stores associations of particular streaming content with security policies that each specify domains allowed to initiate streaming from the streaming service. Requests for the streaming content are received from user-agents. The streaming service identifies respective security policies associated with each of the streaming content indicated by each of the requests and dynamically sets each security policy in a response. The responses are transmitted back to the user-agent where the security policy is enforced. In some instances, the streaming service is an application streaming service that hosts respective applications for different entities for streaming application content, and the security policies specify domains allowed to initiate application streaming from the application streaming service for the corresponding hosted application. A configuration interface for configuring the permitted domains and other features is also disclosed.

20 Claims, 8 Drawing Sheets

(56) References Cited

OTHER PUBLICATIONS

"Embed AppStream 2.0 Streaming Sessions", Retrieved from https://docs.aws.amazon.com/appstream2/latest/developerguide/embed-streaming-sessions.html on Apr. 2, 2020, pp. 1-10.
"Embedding Twitch in Your Website", Retrieved from https://dev.twitch.tv/docs/embed/ on Apr. 2, 2020, pp. 1-3.
Google, "YouTube Player API Reference for iframe Embeds", Retrieved from https://developers.google.com/youtube/frame_api_reference on Jun. 24, 2021, pp. 1-43.

* cited by examiner

Resource Sets

An application streaming instance consists of streaming resources and policies for controlling access to these resources. The streaming resources are made up of instances that are part of a fleet of resources.

[Create Resource Set] [Actions ▼]

| Name | Status | Created At |
|---|---|---|
| ● ExampleTestResourceSet | Active | 2018-10-05 10:18:46 AM UTC -0700 |

« ‹ Viewing 1 to 1 of 1 items › » Results per page [10 ▼]

Details | Storage | User Settings | Tags | Branding | VPC Endpoints

[Edit]

- Name: ExampleTestResources
- Display Name: Example Test Resources
- Description: Example's Test Resource
- Associated Fleet: ExampleFleet
- Status: Active
- Created At: 2018-10-05 10:18:46 AM UTC -0700
- Embed Hosts: example.com
  smile.Example.com
  www.Example.com

*FIG. 5A*

Edit Resource Set

Resource Set description: Example test resources for performing testing.

Resource set redirect URL: https://test.example.com ⓘ

Resource set feedback URL: https://test.example.com ⓘ

▶ *Embed Streaming Application (Optional)*

In this section, you can configure the inputs that define your streaming application experience embedded within your web site/page.

Host Domains:
example.com
smile.example.com
www.example2.com

ⓘ *List of website domains that can embed the streaming application sessions for this set of resources. Input format example — example.com, test.example.com. Only https URLs will be allowed to embed a streaming session*

Cancel   Update

*FIG. 5B*

SECURE EMBEDDING OF PRIVATE CONTENT VIA A DYNAMICALLY-SET SECURITY POLICY

BACKGROUND

Network-based sites control arrangement of content for display in various manners and in concert with browsers that also assert some control of the content. Control of arrangement of web site allows for information to be presented within a particular context that is useful to the audience or the content provider. One way of arranging content is to embed a content resource into other surrounding content in a web-page. Generally, this type of embedding requires that the content resource (e.g., a video) be made public, which prevents the content from being restricted from use by others. Content owners may desire to embed videos in webpages, but may also desire to restrict access to the embedded content such that other web sites are prevented from making use of the same video in the same or different manner.

Furthermore, existing standard web applications (e.g., typical browsers) generally block embedding altogether for security reasons. Some specialized web applications (e.g., specialized viewers that run within a browser or hosted applications) may allow embedding of content, but it is limited to embedding of publicly-available content that can be embedded by any domain, with little-to-no restrictions.

BRIEF DESCRIPTION OF THE DRAWINGS

FIG. 5A illustrates a graphical user interface for a system that implements secure embedding of private content via a dynamically-set security policy, according to some embodiments.

FIG. 5B illustrates a graphical user interface for a system that implements secure embedding of private content via a dynamically-set security policy, according to some embodiments.

Figure 1:
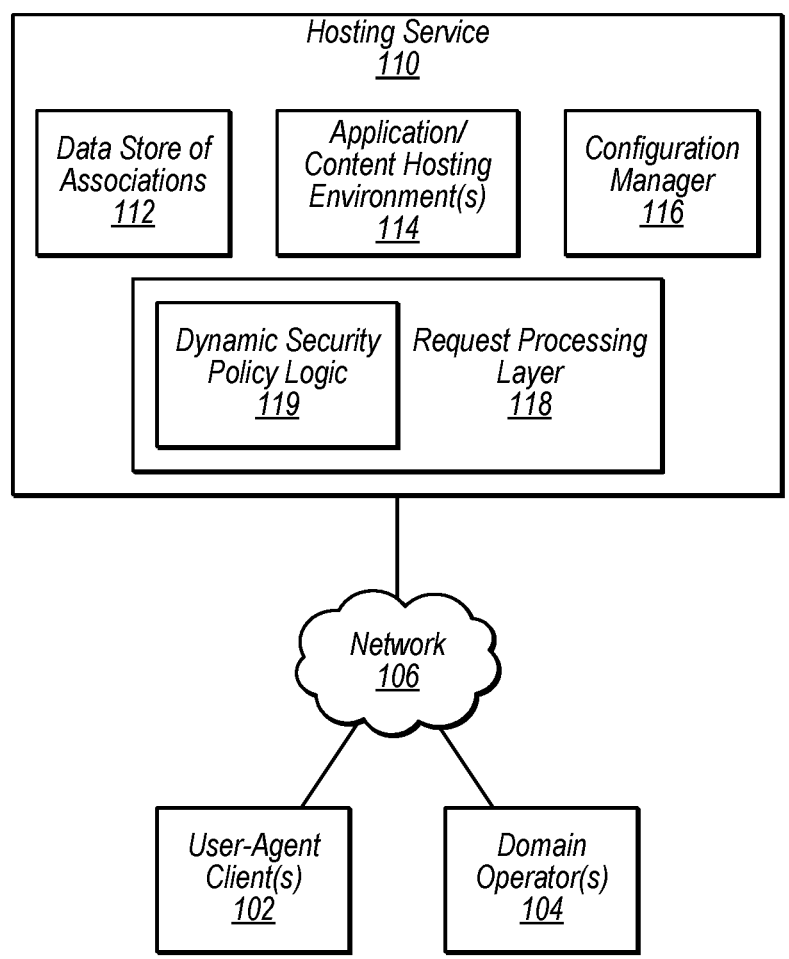
FIG. 1 illustrates a block diagram of an architecture for a system that implements secure embedding of private content via a dynamically-set security policy, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, various embodiments of systems and methods for implementing content security policy header generation at run-time for secure embedding of content are disclosed. In embodiments, a network-based (e.g., web) application for streaming private interactive application content (or other streaming content) may be embedded into a customer-controlled domain in order to stream the streaming application content into the customer-controlled domain while restricting use of that streaming content outside of the customer-controlled domain.

While some examples herein are provided within a context of streaming application content, it is contemplated that the techniques and systems describe herein (e.g., for secure embedding of content via a dynamically-set security policy) are broadly applicable to other types of content, such as, but not limited to, (non-streaming) web application, other application, audio, image, message, text and video, which may be hosted in an appropriate environment. Various different types of content may be delivered (e.g., a video stream may be streamed, an image may be transmitted over a network, etc.) as technically appropriate. For example, various types of content may be hosted and delivered by various combinations of one or more content hosting environments. Execution of application content may include streaming graphical output from execution of the application content, in embodiments.

Some websites prevent embedding using a header (e.g., a content security policy header (a "CSP header")). Depending on how the policy is configured, it is possible to prevent embedding or allow it. Typically, websites will handle this in a static fashion: a static header specifies either allow/deny all embedding, allow only the "same origin", or specify some select internal sites, or the like.

Embodiments disclose functionality that controls where a particular streaming content can be embedded (e.g., dynamically, at run-time, based on a security policy that may specify access based on characteristics of the request or requesting entity, characteristics of the requested resource, or the like). Streaming content may include any streaming content, including but not limited to previously-recorded video content, live video content, or streaming application content providing a view of graphical (and/or audio) output of executing resources (e.g., output of applications) of a fleet of resources of a service provider, etc.

It can be desirable to restrict some video content from being embedded, such as private content. For instance, a company may provide internal training via a training webpage with embedded streaming content and may desire to restrict the embedded content to certain domains, preventing others from embedding or otherwise using the same streaming content. Private content may be content that is associated with, or which access to requires, some sort of authentication and/or authorization, in embodiments. In some embodiments, content may be made private by restricting access to the content via a time-limited identifier (e.g., a time-limited URL). Some embodiments provide an effective protection mechanism for preventing unauthorized embedding of various types of streaming content.

In embodiments, an example of a domain is the name of a web site, a URL is an identifier used to find a website, and a website is what people see and interact with when they get there. A domain name may be owned by an entity and used as an identifier. In embodiments, a domain name is an identification string that defines a realm of administrative autonomy, authority or control within the Internet. Domain names may be used in various networking contexts and for application-specific naming and addressing purposes. In general, a domain name identifies a network domain, or it represents an Internet Protocol (IP) resource, such as a personal computer used to access the Internet, a server computer hosting a web site, or the web site itself or any other service communicated via the Internet.

In embodiments, a property (e.g., a configurable and/or optional property) associated with a streaming content is set (e.g., via a console of a service provider by an authorized user, or programmatically (command line interface/software developer kit (CU/SDK)) or otherwise). In a resource-based embodiment, a resource property is set for a particular customer's resource in the service provider's console or via the CLI/SDK, for example.

In embodiments, the property allows creation of a list of "allowed domains" for that specific streaming content or resource that generates the streaming content. Enforcement is generally at the browser. For example, an allowed domain is allowed to embed the streaming content item, in embodiments. All other domains are not allowed to access the content. When the browser receives the list of allowed domains, the browser generally enforces the restrictions by preventing or allowing access to the content.

In some embodiments, a CSP header (content security policy header) may be generated in response to a request for the content, at runtime, for example. In embodiments, an application (e.g., a service provider's streaming service or application) changes the CSP response for the particular resource (e.g., an application or a set of resources) that has been requested. The change may be performed dynamically, that is, for each request, at run-time, based on a security policy of the particular resource requested, or the like, for example. In contrast, other types of CSP configuration (e.g., static configuration) store a static Content-Security-Policy HTTP header, with static configuration values to control resources the user agent is allowed to load for that page, as part of a stored web page. Static-based configurations may be less desirable because they are limited to providing the same single Content-Security-Policy HTTP header, irrespective of the entity making the request, irrespective of characteristics of the content, etc.

In embodiments, such a mechanism (secure embedding of private content via a dynamically-set security policy) may allow a customer to safely embed streaming video while preventing other unauthorized sites to embed the same streaming video. For example, some malicious sites use phishing attacks to trick users into visiting their site to intercept data—see "clickjacking attacks". At least some types of phishing attacks may be avoided by practicing techniques described herein.

Also disclosed is an interface to programmatically interface with an embedded application. In embodiments, the programmatic interface provides programmatic control of private content (e.g., restricted, non-public content) such as protected streaming video content or programmatic control of a remote application, such as a desktop application or the like, with an embedded application that is executed at the browser. For example, embodiment provide for embedding application streaming content, and in code executed at the browser, control playback and/or other functionality, such as input to an application or resource executing on a remote instance that is reflected in the resultant streamed content displayed in the browser.

In embodiments, a streaming service provides access to both: public content that is publicly available without restriction on domains allowed to initiate streaming of the public content, and to private content associated with corresponding security policies that restrict access by specifying one or more domains allowed to initiate streaming of the private content from the streaming service.

Embedded Example

Non-exhaustive example of an embedded streaming video architecture, using the car dealership website example is provided. A car dealership wants to provide a virtual automobile viewing experience to customers over the Internet via a 3D vehicle viewing application, embedded in the dealership's website (within the dealerships domain).

As explained above, typical browsers may enforce restrictions on embedding video content. In some such architectures, the video content may only be played by the browser by opening another tab on the browser that is used exclusively for a 3D vehicle viewing application. But such an experience takes a potential customer out of the context of the dealership website because the dealership website and the 3D vehicle viewing application cannot be viewed together, which is undesirable.

The dealership has spent money on obtaining rights to provide the 3D vehicle viewing application and wishes to prevent other dealerships from presenting the 3D vehicle viewing application as their own. For example, in some system architectures, it is possible to identify a URL or other identifier in the dealerships website that is associated with the 3D vehicle viewing application resource or service and to simply place that same identifier in another website in order to provide that same 3D vehicle viewing application experience via the other website.

Instead, the car dealership wants to provide a virtual automobile viewing experience to customers over the Internet via a 3D vehicle viewing application that is embedded into a page of the dealership's website (within the dealerships domain) while preventing others from using the same streaming content.

At least some embodiments disclosed herein provide for embedding and protecting streaming content by determining (e.g., at runtime and based on a set of resources that produces the 3D vehicle viewing application) one or more domains that are permitted to display the streaming content produced by the 3D vehicle viewing application, and generating (e.g., at runtime) a security policy header for the dealership webpage that includes the one or more permitted domains. When a customer's browser receives the security policy header for the dealership webpage that includes the one or more permitted domains it enforces the security policy header. In this example, the browser only displays the streaming content produced by the 3D vehicle viewing application in a webpage with a domain that matches the permitted domains and generates an error if the streaming content produced by the 3D vehicle viewing application is attempted to be embedded in a non-permitted domain.

In some embodiments, a benefit is that the context of dealership website is maintained during the streaming experience, while also preventing other domains, other dealerships, from embedding the same 3D vehicle viewer application in their own domain/web site/app., etc.

Illustrated in FIGS. 1, 2, 5A, 5B, 6 and 7 are block diagrams and graphical user interface examples of a system architecture for a system that implements secure embedding of private content via a dynamically-set security policy. One or more of the components illustrated in FIGS. 1, 2, 5A, 5B, 6 and 7 may implement or otherwise be associated with functionality depicted in process flow charts 3 and 4, in embodiments.

FIG. 1 illustrates a block diagram of an architecture for a system that implements secure embedding of private content via a dynamically-set security policy, according to some embodiments. The illustrated components may perform functionality illustrated in FIGS. 3 and 4, in embodiments.

Hosting service 110 is depicted as being accessible over network 106 by Domain Operator(s) 104 and End-User Client(s) 102. In some embodiments, Domain Operator(s) 104 own, control or are otherwise responsible for domains that may be hosted by the domain operator (e.g., hosted by an enterprises system of the domain operator) or by a hosting service, such as Hosting Service 110 or by some other third-party hosting service. Domain Operator(s) may embed content items hosted by Hosting Service 110 into their domain content.

Generally, User-Agent Client(s) 102 make requests (e.g., via a user-agent, such as a browser, specialized application, or the like) over network 106 (an enterprise network or the Internet or the like) to view content of the domains, including the embedded content hosted by the Hosting Service 110. In embodiments, a user agent is software (a software agent—e.g., an application, streaming application or the like, etc.) that is acting on behalf of a user, such as a web browser that retrieves, renders and facilitates end user interaction with network-based content such as Web content.

A Request Processing Layer 118 receives the requests, and performs any required authentication or authorization. The illustrated Dynamic Security Policy Logic 119 may determine user-agent information (sometimes referred to herein as "client" or "browser-type information") and the requested content item, based on the request. Access to the content item may be based on the user-agent information, and association data from a data store, such as a corresponding security policy for the requested content item. The illustrated Dynamic Security Policy Logic 119 may also set the security policy in the response. The Hosting Service 110 may transmit the response with the security policy back to the user-agent to indicate to the client whether a domain for the request from the user-agent is allowed to proceed with playing the streaming content item from the streaming service.

The Data store of Associations 112 may be implemented as a data store that stores associations of different security policies for different ones of the hosted applications. As described herein, different security policies specify respective domains allowed to initiate application streaming from the application streaming service for the corresponding hosted application, in embodiments.

In some embodiments, various associations for other headers may be stored in a data store like Data Store of Associations 112. A non-exhaustive list of examples headers includes other CSP headers, such as, but not limited to: frame-src (specifies valid sources for nested browsing contexts loading using elements such as <frame> and <iframe>), base-URI (restricts the URLs which can be used in a document's <base> element), connect-src (restricts the URLs which can be loaded using script interfaces), default-src directive (serves as a fallback for the other CSP fetch directives), navigate-to (restricts the URLs to which a document can initiate navigations), Report-To HTTP response header (instructs the user agent to store reporting endpoints for an origin), and prefetch-src (specifies valid resources that may be prefetched or prerendered).

Application/Content Hosting Environment 114 generally hosts streaming content. For example, an application hosting environment may host applications that generate interactive streaming application content, and a content hosting environment may host pre-recorded or live content such as movies, or videos or the like. Either type of content may be referred to as a content item, in embodiments. In some embodiments, a hosting environment 114 may host other types of content, such as, but not limited to, application, audio, image, message, text and video without departing from the scope of this disclosure.

Configuration Manager 116 is illustrated and may be configured to provide a configuration interface that the multiple different authorized clients may interact with to manage configuration of the system. For example, Configuration Manager 116 may perform some of the operations illustrated in FIG. 4 and may implement features similar to those illustrated in FIGS. 5a and 5B, in embodiments.

Figure 2:
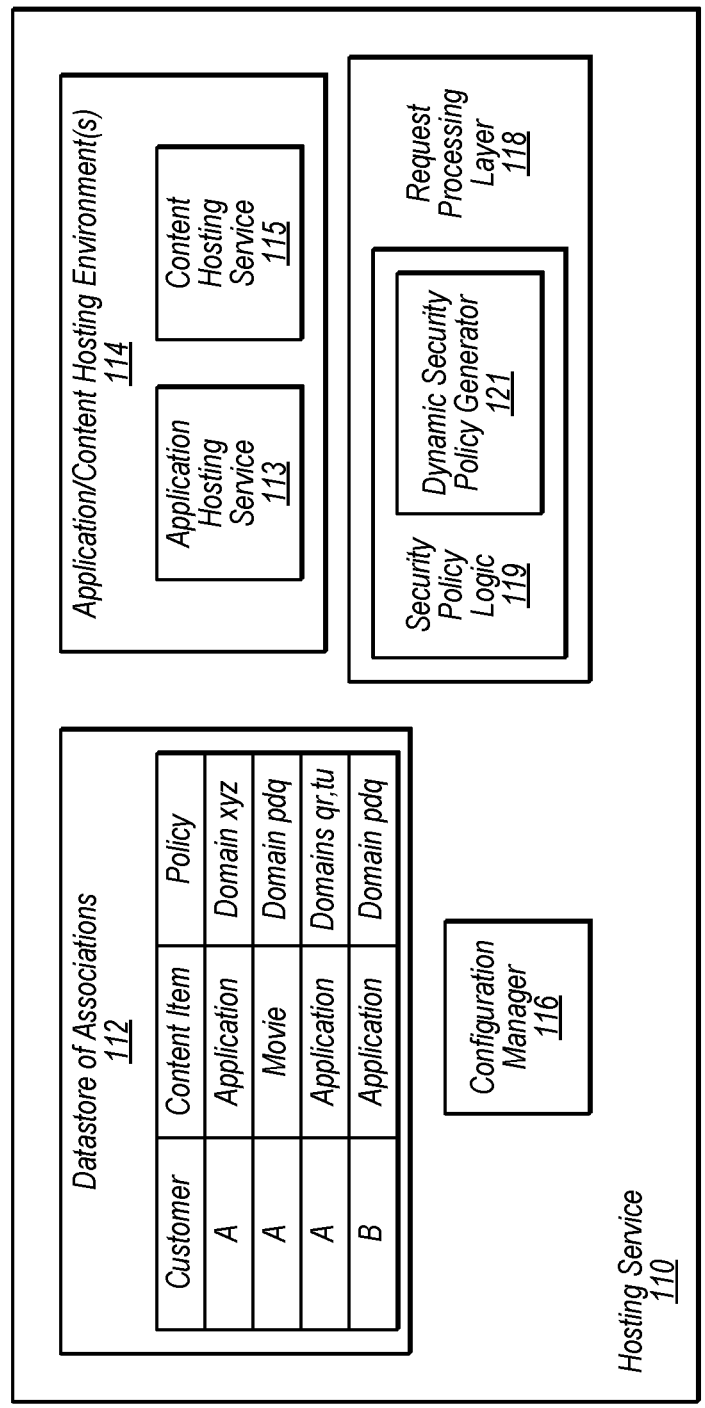
FIG. 2 illustrates a block diagram of an architecture for a system that implements secure embedding of private content via a dynamically-set security policy, according to some embodiments.

FIG. 2 illustrates a block diagram of an architecture for a system that implements secure embedding of private content via a dynamically-set security policy, according to some embodiments. The illustrated components may perform functionality illustrated in FIGS. 3 and 4, in embodiments.

Illustrated is a Datastore of Associations 112 that is illustrated as storing associations between content items and security policies. Information stored as a security policy may include, but is not limited to an identifier of a content item, a list of permitted domains that are permitted to embed content items, user-agent information, such as browser type or the like, URL expiration data, etc. In the illustrated embodiment, customer A owns or controls a content item "Application" of a streaming application service and has listed domain "xyz" as a domain that is permitted to embed that particular streaming application.

Application/Content Hosting Environment 114 is illustrated and includes Application Hosting Service 113 that hosts streaming application content items, and Content Hosting Service 115 that hosts streaming content items such as, but not limited to movies, videos, or the like.

Request processing layer 118 is illustrated with Security Policy Logic 119 and Dynamic Security Policy Generator 121. Generally, request processing layer 118 receives and processes requests for content items, Security Policy Logic 119 validates access credentials and processes time-limited URLs. Dynamic Security Policy Generator 121 generally sets security policies for responses, based on information in the request and based on information stored in the association data store, such as the security policy.

In embodiments, Dynamic Security Policy Logic 119 may be configured to set header information for other CSP headers, such as, but not limited to: frame-src (specifies valid sources for nested browsing contexts loading using elements such as <frame> and <iframe>), base-URI (restricts the URLs which can be used in a document's <base> element), connect-src (restricts the URLs which can be loaded using script interfaces), default-src directive (serves as a fallback for the other CSP fetch directives), navigate-to (restricts the URLs to which a document can initiate navigations), Report-To HTTP response header (instructs the user agent to store reporting endpoints for an origin), and prefetch-src (specifies valid resources that may be prefetched or prerendered).

Figure 3:
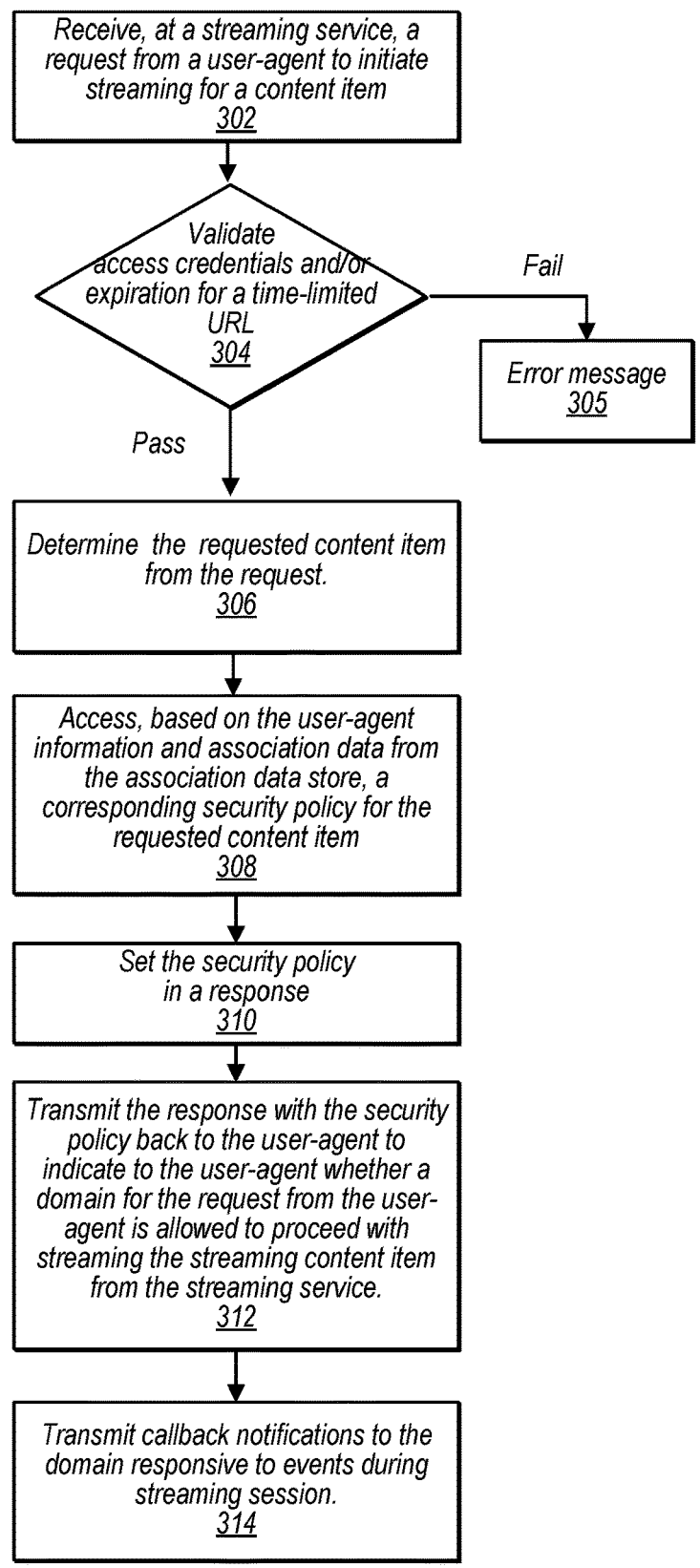
FIG. 3 illustrates a flowchart for secure embedding of private content via a dynamically-set security policy, according to some embodiments.

FIG. 3 illustrates a flowchart for secure embedding of private content via a dynamically-set security policy, according to some embodiments. In some instances, the depicted functionality may be performed by one or more of the components illustrated in any of FIGS. 1, 2, 5A, 5B, 6 and 7. The illustrated embodiment describes streaming content items. In embodiments, streaming content items include streaming content such as live or pre-recorded video, movies or the like as well as streaming application content generated as one or more applications are executed on a computer. It is contemplated that similar processes can be performed for other types of content such as, but not limited to, application streaming for hosted applications, live video streaming (e.g., for teleconferences or entertainment or otherwise, etc.).

As illustrated in FIG. 2, associations of different security policies for different streaming content are stored (e.g., to data store 112). In embodiments, different security policies specify domains allowed to initiate streaming from the streaming service, such as from Application/Content Hosting Environment 114 (e.g., an application streaming service or other type of streaming service). It is contemplated that security policies may specify other restrictions on the initiation of streaming content, in some embodiments.

Generally, content items may be accessed via some sort of identifier for the content item. For example, a URL may be generated to identify a content item. In some instances, a domain operator may request (e.g., request from the hosting service that hosts the content item) generation of a URL for a content item, as part of generating and transmitting a requested page of the domain to a user-agent (e.g., a domain hosted by a third-party hosting service or the like). The requested URL may be sent to the user-agent as part of the requested web-page and then transmitted from the user-agent to a hosting service that hosts the content item identified by the URL. In some instances, time-limited URLs may be generated that identify a content item and that expire after some period of time or at a set time, for example. In some instances, the domain operator may generate the URL.

Block 302 in particular illustrates that a request is received at a streaming service from a user-agent to initiate streaming for a content item (e.g., application streaming content for a particular hosted application, or other streaming content such as a streaming video or the like, etc.). The request may be received by request processing layer 118 that validates access credentials and/or expiration of a time limited URL (block 304), in embodiments. If the validation fails, an error message may be sent (block 305).

Authentication and Authorization

Generally, systems implementing the disclosed content security policy header generation at run-time for secure embedding of content may rely upon existing authentication and authorization techniques and/or systems. In some instances, the disclosed techniques may be integrated with separate Security Assertion Markup Language (SAML)-based authentication and authorization. For example, SAML is an open standard for exchanging authentication and authorization data between parties, in particular, between an identity provider and a service provider. An application stream provider may rely upon SAML for authentication. In embodiments, systems may also or alternatively implement user pools (e.g., enforcing credentials like username and password). Authentication and/or authorization may be implemented at various levels to meet security needs of clients of a service provider, for example. Authentication and/or authorization may be implemented for accessing the resources that generate the application streaming content, for example. In some embodiments, a request includes credentials for accessing streaming application content from the particular one of the hosted applications and the service validates those credentials. In embodiments, a web-application executing at a streaming-content-requesting user-agent may interact with one or more systems of a service provider (e.g., with the Application/Content Hosing Environment(s) 114) to implement authentication and/or authorization that is relied upon to protect unauthorized access to the streaming content or to the underlying resources that generate the streaming content.

Time-Limited URL

In some embodiments, an application program interface (API) may be provided that, when called, generates a time-limited identifier (e.g., a streaming universal resource locator ((URL). The time-limited identifier may be associated with an expiration (e.g., an expiration that is configurable, or set by the requesting entity, or set by default, or set according to a standard of a service provider, etc.). The time-limited identifier may expire after the expiration, no longer providing access to the resource (e.g., a video resource or set of resources) associated with the time-limited identifier, in embodiments. In some embodiments, the transmitted response includes a time-limited URL for accessing streaming application content from the particular one of the hosted applications.

As illustrated in FIG. 3, if the validation passes, the system may dynamically respond to the request (e.g., respond in real-time with regard to the request) in embodiments. For example, at block 306, in response to receipt of the request from the client to initiate streaming for a particular content (e.g., for one of the hosted applications, for a content item, etc.) the requested content item is determined from the request. In some embodiments, user-agent information may be determined from the request at this point (e.g., for later use in setting the security policy, etc.). In the illustrated embodiment, a security policy associated with the streaming content is identified. For example, security policy logic 119 may access, based on the association data from the association data store (and based on user-agent information, in some embodiments), a corresponding security policy for the requested content item (block 308). As described herein, the user-agent may be a web browser, in some embodiments and the process includes determining, by the streaming service, a browser type for the web browser. The identification of the first security policy associated with the particular streaming content item is based at least in part on the browser type, in embodiments.

In the application streaming example, the system may identify, based on the associations stored in the data store, a security policy for the particular one of a fleet of hosted applications. In some embodiments, the technique may include determining, by the streaming service, different security policies for different requests for different content or for different computer resources such as an application or a set of resources.

At block 310, the security policy may be set in a response. For example, the Dynamic Security Policy Generator 121 may prepare a response to the request based on the associations from the association data store 112, where the response specifies the determined security policy in the response (e.g., specifies the list of permitted domains). The specified security policy may be determined based on user-agent information (e.g., application type, operating system, software vendor, or software revision, etc.). Other headers may be set, in embodiments, such as, but not limited to: frame-src, base-URI, connect-src, default-src directive, navigate-to, Report-To HTTP response header, and prefetch-src, based on information stored in the association data store 112, or other information, for example.

In embodiments, the response specifying the determined security policy is transmitted (e.g., by request processing layer 118) back to the user-agent to indicate to the user-agent whether a domain for the request from the user-agent is allowed to proceed with streaming content from the particular one of the hosted applications (block 312).

In embodiments, the transmitted response includes a time-limited URL for accessing streaming application content from the particular one of the hosted applications. The user-agent (e.g., a browser or specialized application, etc.) may enforce the security policy, by refusing to display the streaming content, responding with an error message, or the like, in embodiments. In some embodiments setting the security policy in the response is performed by the streaming service at run-time. The system may generate a response that includes a content security protocol (CSP) HyperText Transfer Protocol (HTTP) header, based on the security policy. Some techniques include dynamically altering the CSP header, subsequent to a request for the content. For example, the CSP header may be generated based on a list of domains specified in a data store of associations. In embodiments, the transmitted response may include the CSP HTTP header. Some embodiments particularly tailored toward an X-Frame-type implementation are contemplated. Functionality depicted in blocks 304-314 may be repeated for a number of different requests. Box 314 may not apply in some embodiments or for some streaming content sessions.

In some embodiments, the process illustrated in FIG. 3 may be extended. For example, in some embodiments the particular streaming content item may be private streaming content item protected via credentials. For the content, the process may include verifying, by the streaming service prior to transmitting the response, that the request includes valid credentials for accessing the private streaming content item.

Embodiments that stream both public and private content are contemplated as the different security policy for different content allows content to be treated different, in some examples. For example, for public content, the process may include receiving, by the streaming service, a request to initiate streaming of particular streaming content item that is a public content item, and performing, by the streaming service, the identifying of the security policy, the setting of the security policy and the transmitting of the response for the second request without requiring credentials for accessing the public streaming content item.

In embodiments, callback notifications may be sent to the domain, based on various types of interactions at the user-agent. The interactions may cause state changes associated with the content (e.g., stop, start, input to an executing application, toolbar state changes, etc.). For example, the process illustrated in FIG. 3 may further include streaming, by the streaming service, the particular streaming content item to the user-agent. A user may interact with toolbar features of the streaming content (e.g., features such as player controls such as start/stop, etc.). The streaming service may receive indications of events (e.g., start or stop events, etc.) for the particular streaming content, and transmit, based on the indications of start or stop events from the user-agent, one or more callback notifications to a domain (e.g., domain operator 104) that initiated the request for the particular content item via the user-agent (block 314).

Other types of input may also be communicated back to the domain. For example, the streaming service may receive, from the user-agent, indications of user input to interactive elements of the streaming content (interaction with streaming application content itself, such as input to the executing application or computer resource that cause changes of state) and transmit, based on the indications of user input from the user-agent, callback notifications to a domain that initiated the request for the particular streaming content item from via the user agent. A state change example is changing to full-screen mode. The surrounding content of the domain webpage in which the streaming application is embedded may change or be changed based on the callback notifications, in embodiments.

It is contemplated that callbacks based on the notifications can be routed to the domain via various combinations of HTTP posts, either through the streaming application service and a backchannel to the domain, or directly to the domain via the browser (e.g., via an application the executes at the browser) for example.

In embodiments, callback notifications may be used to send input from a parent application to an embedded application, and from the embedded application to the streamed application running on a set of resources of a remote host. In embodiments, the application that receives callback information from the embedded application may be (instead of a streamed application) an application streaming from a remote host, a web application or a (non-streaming) application hosted remotely. Such an architecture may support various types of functionality, such as controlling the data stream, for example.

Some embodiments provide for receiving, via a configuration interface of the streaming service, configuration settings for the content item that specify toolbar options to be present for display at the user-agent when the content item is streamed. Transmitting the response (block 312) may include streaming the content item according to the one or more configuration settings that specify the toolbar options, in some embodiments.

Figure 4:
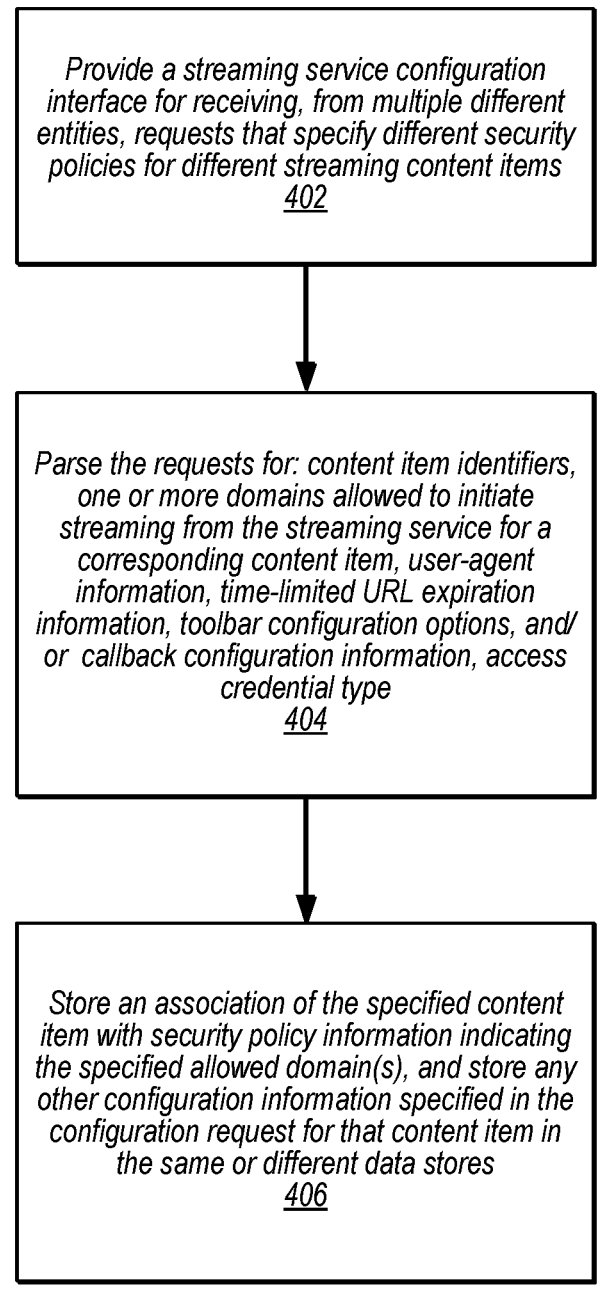
FIG. 4 illustrates a flowchart for receiving and processing configuration requests for a system that implements secure embedding of private content via a dynamically-set security policy, according to some embodiments.

FIG. 4 illustrates a flowchart for processing configuration requests for a system that implements secure embedding of private content via a dynamically-set security policy, according to some embodiments. In at least some embodiments, the functionality depicted in FIG. 4 may be performed via some combination of configuration manager 116 and the graphical user interfaces illustrated in FIGS. 5A and 5B, described below.

In at least the illustrated embodiment, the configuration manager 116 may provide a streaming service configuration interface for receiving, from multiple different entities, requests that specify different security policies for different streaming content items (block 402). At block 404, the requests are parsed for: content item identifiers, one or more domains allowed to initiate streaming from the streaming service for a corresponding content item, user-agent information, time-limited URL expiration information, user interface (e.g., toolbar) configuration options, and/or callback configuration information, access credential type. At block 406, an association of the specified content item with security policy information indicating the specified allowed domain(s) is stored. In some embodiments, any other configuration information specified in the configuration request for that content item may or may not be stored, in the same or different data stores.

In embodiments, the interface receives, from different entities, browser-based configuration values for security policies for the streaming content. The security policies specify domains allowed to initiate streaming from the streaming service for the corresponding streaming content.

The domains are stored as part of each security policy associated with respective streaming content, in embodiments. For a URL expiration configuration, the system may store the URL expiration configuration to a data store (e.g., Data Store of Associations 112) or other data store. The configuration data may be obtained via some combination of data interface elements of a GUI and application program interface, SDK, or VIA command-line-interface, or otherwise, without limitation.

FIGS. 5A and 5B illustrate a graphical user interface for a system that implements secure embedding of private application streaming content via a dynamically-set security policy. In at least some embodiments, various other types of streaming content may be securely embedded using a similar technique.

FIG. 5A illustrates a graphical user interface for a system that implements secure embedding of private content via a dynamically-set security policy, according to some embodiments. The depicted embodiment may be implemented by one or more of the components of the computer systems illustrated in FIGS. 1, 2, 6 and 7, for example, and may be associated with, or facilitate, functionality illustrated in FIGS. 3, 4 and 5.

In at least the depicted embodiment, the illustrated graphical user interface (GUI) provides both display, and selectable, user interface elements associated with creating and managing a set of resources, as well as other actions associated with resources. The set of resources (e.g., hosted by Application/Content Hosting Environment(s) 114) may generate output video content that may be streamed to a client, e.g., by a streaming service such as streaming service 630.

Illustrated is an example test set of resources ("ExampleTestResources") for an entity that is an owner of, or otherwise controls the test resources listed on the illustrated page. The ExampleTestResources is illustrated as having an active status and was created in 2018. On the lower half of the illustrated GUI, Details of the set of resources are specified, such as Name of the resource set, displayed name of the test set of resources, description of the test resource(s), the fleet of resources associated with the test resources (e.g., a fleet of a pool of remote instances or a fleet of various types of applications arranged variously on a customer behalf, the status of the test resource(s), creation date and time, and a list of domains as allowed embed hosts ("Example.com," "smile.Example.com," and "www.Example.com"). In embodiments, the listed domains are part of a security policy and are the domains allowed to initiate application streaming from the application streaming service for the corresponding hosted application, "ExampleTestResources."

FIG. 5A also illustrates user-selectable tabs indicating storage locations associated with the set of resources, user settings associated with the set of resources, tags associated with the set of resources, branding associated with the set of resources, and VPC endpoints associated with the set of resources.

FIG. 5B illustrates a graphical user interface for a system that implements secure embedding of private content via a dynamically-set security policy, according to some embodiments. In at least one embodiment, FIG. 5B illustrates another GUI that is generated in response to selection of the "Edit" user interface element illustrated in FIG. 5A.

In particular, FIG. 5B illustrates user-selectable and user-editable fields associated with editing and/or managing a resource set. An editable resource set description field provides for entry of a description of the resource set, and resource set redirect and feedback URLs are also depicted.

In the lower-half of the GUI an editable field is provided for listing Host Domains. In embodiments, an authorized user is provided with the option of listing domains that are allowed to embed the streaming application sessions for the particular resource set, "ExampleTestResources." A format for the domains may be specified, and in some embodiments, only Hypertext Transfer Protocol Secure (HTTPS) URLs are allowed to embed a streaming session (e.g., for private, protected content). In embodiments, authorized users do not set a content security policy directly. In the illustrated embodiment, the user-selectable and user-editable fields provide a user-friendly way for the system to obtain a list of host domains from an authorized user and the system translates those domains into a security policy.

In at least some embodiments, the configuration interfaces illustrated in FIGS. 5A and 5B (or other configuration interfaces) may support configuration of other CSP headers, such as, but not limited to: frame-src (specifies valid sources for nested browsing contexts loading using elements such as <frame> and <iframe>), base-URI (restricts the URLs which can be used in a document's <base> element), connect-src (restricts the URLs which can be loaded using script interfaces), default-src directive (serves as a fallback for the other CSP fetch directives), navigate-to (restricts the URLs to which a document can initiate navigations), Report-To HTTP response header (instructs the user agent to store reporting endpoints for an origin), and prefetch-src (specifies valid resources that may be prefetched or prerendered).

Figure 6:
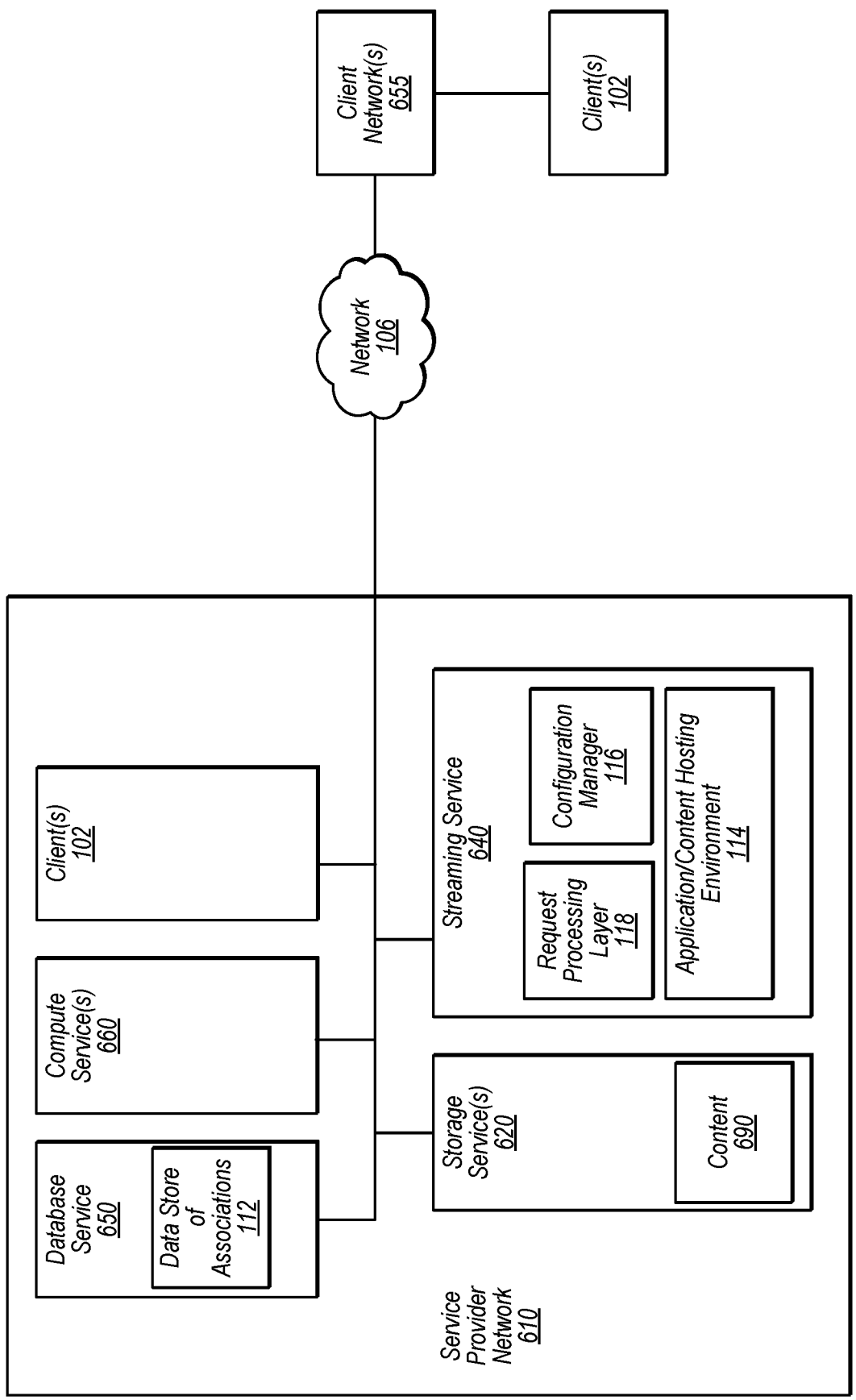
FIG. 6 illustrates a block diagram of an architecture for a service provider that implements secure embedding of private content via a dynamically-set security policy, according to some embodiments.

FIG. 6 illustrates a block diagram of an architecture for a service provider that implements secure embedding of private content via a dynamically-set security policy, according to some embodiments. Illustrated components of the service provider network 610 in FIG. 6 may perform functionality depicted in FIGS. 3-5, described above, in embodiments.

Depicted is a service provider network 610 that provides service over a network 106 (e.g., over the Internet or private networks of a combination thereof) to clients 102 that may be arranged on client networks 655. Service Provider Network 610 is illustrated with a Database Service 650, Compute Service(s) 660, Client(s) 102, Storage Service(s) 620, and Streaming Service 640.

In the illustrated embodiment, components illustrated and described in FIGS. 1 and 2 are implemented on or across various of the services of the service provider network. For example, Data Store of Associations 122 is implemented via Database Service 650 of Service Provider Network 610. Content 690 (e.g., pre-recorded streaming content such as movies, videos or the like) is stored at Storage Service 620. Also illustrated are Request Processing Layer 118, Configuration Manager 116 and Application/Content Hosting Environment 114, implemented via Streaming Service 640. It is contemplated that components may be implemented on across the services in other combinations than the illustrated embodiment. In some embodiments, the Application/Content Hosting Environment 114 may access content 690 of storage service 620 to send content items as streaming content. For Application/Content Hosting Environment 114 the streaming service 640 may be implemented on its own compute service or may use compute instances from compute service 650. One or more of the components in FIG. 6 may be implemented by one or more of the computing nodes 700 illustrated in FIG. 7, in embodiments.

Example Computer System

Figure 7:
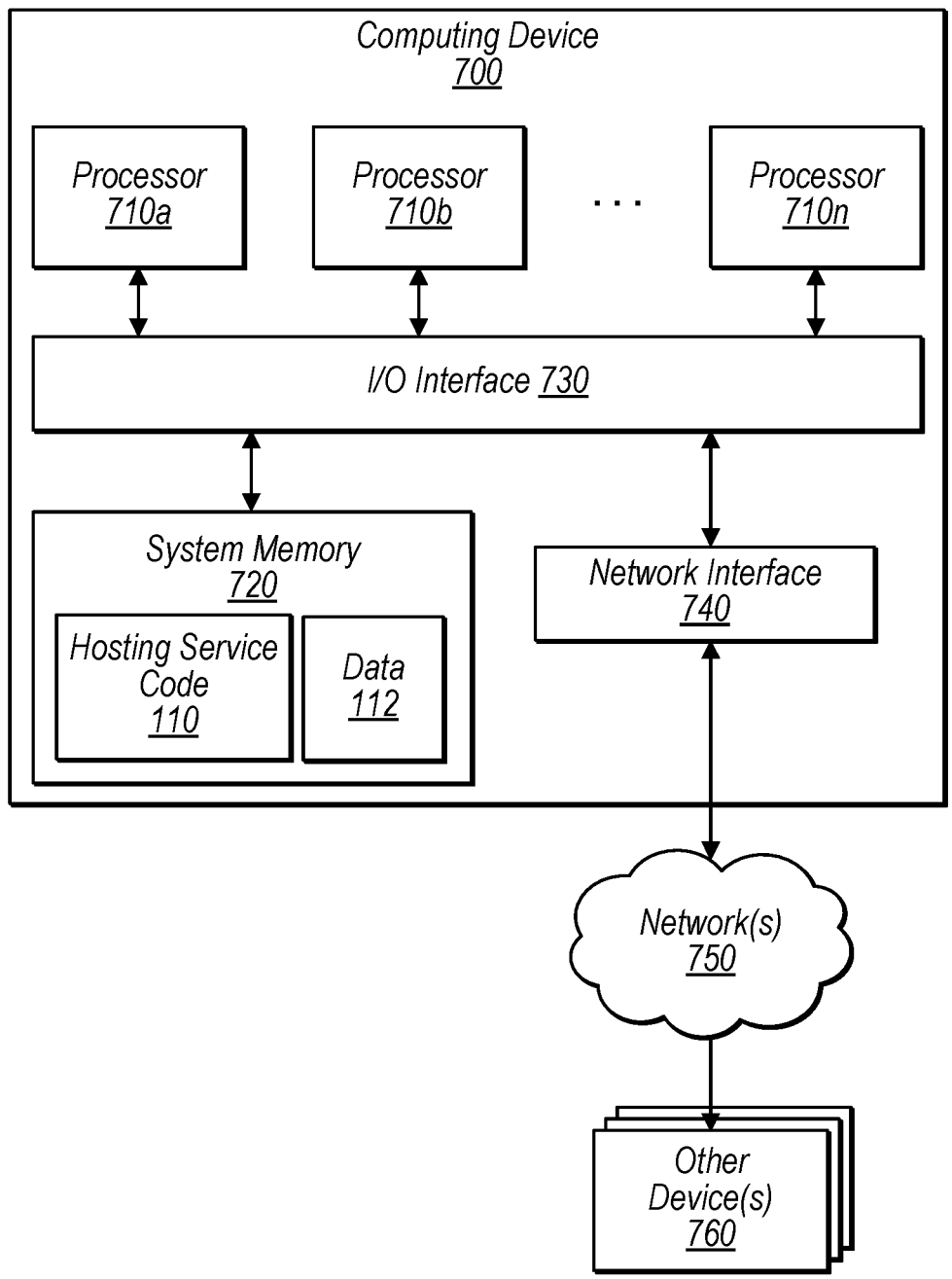
FIG. 7 illustrates an example of a computer system, one or more of which may implement various components described and illustrated throughout the disclosure, including components of one or more systems that implement secure embedding of private content via a dynamically-set security policy, according to embodiments.

FIG. 7 illustrates an example of a computer system, one or more of which may implement various components described and illustrated throughout the disclosure, including components of a system that implements secure embedding of private content via a dynamically-set security policy, according to embodiments.

Various portions of systems in FIGS. 1, 2, 5A, 5B, 6, and 7 and/or methods presented in FIGS. 3 and 4 described herein, may be executed on one or more computer systems similar to that described herein, which may interact with various other devices of the system.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 760, such as cursor control device, keyboard, audio device, and display(s). In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for secure embedding of private content via a dynamically-set security policy may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a secure embedding of private content via a dynamically-set security policy system and method, are shown stored within system memory 720 as hosting service code 110 and data 112, respectively. In other embodiments, program instructions and/or data may be received, sent, or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740. Program instructions may include instructions for implementing the techniques described with respect to any of the FIGs.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 700 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions (e.g., such as code 210), configured to implement embodiments of secure embedding of private content via a dynamically-set security policy systems and methods as described herein, and data storage 112, comprising various data accessible by the program instructions 110. In one embodiment, program instructions 110 may include software elements of a method illustrated in the above figures. Data storage 112 may include data that may be used in embodiments described herein. In other embodiments, other or different software elements and/or data may be included.

Those skilled in the art will appreciate that computer system 700 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., secure embedding of private content via a dynamically-set security policy) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computers of an application streaming service that hosts respective applications for a plurality of different entities for streaming application content to users;
a data store that stores associations of different security policies for different ones of the hosted applications, wherein the different security policies specify respective one or more domains allowed to initiate application streaming from the application streaming service for the corresponding hosted application; and
one or more computers that implement a request processor of the application streaming service configured to:
receive a request from a user-agent to initiate application streaming for a particular one of the hosted applications;
determine, based on the associations stored in the data store, a security policy for the particular one of the hosted applications;
prepare a response to the request, wherein the response specifies the determined security policy in the response; and
transmit the response specifying the determined security policy back to the user-agent to indicate to the user-agent whether a domain for the request from the user-agent is allowed to proceed with streaming content from the particular one of the hosted applications.

2. The system of claim 1, wherein:
the streaming content from the particular one of the hosted applications comprises private streaming content protected via credentials; and
the request processor of the application streaming service is further configured to:
verify that the request includes valid credentials for accessing the private streaming content.

3. The system of claim 1, wherein the request processor of the application streaming service is further configured to:
determine whether a time-limited URL, for the received request from the user-agent to initiate application streaming, has expired; and
responsive to determining the time-limited URL for the received request has expired, transmit an error message to the user-agent.

4. The system of claim 1, wherein:
the application streaming service is a network-based application streaming service of a service provider network that provides the application streaming service to the plurality of different entities; and
the data store that stores associated of different security policies for different ones of the hosted applications is a database stored in a database service of the service provider network.

5. A computer-implemented method, comprising:
storing, by a content hosting service, associations of different content items with different security policies that each specify one or more domains allowed to initiate presentation of the content from the content hosting service;

in response to receiving, by the content hosting service, a first request from a user-agent to initiate presentation of a particular content item:
  identifying, based on the stored associations, a first security policy associated with the particular content item indicated by the request;
  setting the first security policy in a response; and
  transmitting the response with the first security policy back to the user-agent to indicate to the user-agent whether a domain for the first request from the user-agent is allowed to proceed with presenting the particular content item from the content hosting service.

6. The method of claim 5, further comprising:
repeating, by the streaming service, said receiving a request, said identifying a security policy, said setting the security policy, and said transmitting the response for multiple additional requests, wherein different responses to different ones of the requests for different content items indicate different security policies according to the stored associations.

7. The method of claim 5, further comprising:
verifying, by the content hosting service, prior to transmitting the response, that a time-limited URL for the received request from the user-agent to initiate transmission of the particular content item, has not expired.

8. The method of claim 5, wherein:
the particular content item comprises a private content item protected via credentials; and
the method further comprises:
  verifying, by the content hosting service prior to transmitting the response, that the request includes valid credentials for accessing the private content item.

9. The method of claim 8, further comprising:
receiving, by the content hosting service, a second request to initiate delivery of another particular content item that is a public content item; and
performing, by the content hosting service, said identifying a security policy, said setting the security policy and said transmitting the response for the second request without requiring credentials for accessing the public content item.

10. The method of claim 5, wherein:
the user-agent comprises a web browser;
the method further comprises determining, by the content hosting service, a browser type for the web browser; and
said identifying the first security policy associated with the particular content item is based on the browser type.

11. The method of claim 5, wherein:
the content comprises streaming content hosted by a streaming content hosting service; and
the method further comprises:
  streaming, by the streaming service, the particular streaming content item to the user-agent;
  receiving, by the streaming service from the user-agent, an indication of one or more state change events for the particular streaming content; and
  transmitting, by the streaming service, based on the indication of the state change events from the user-agent, one or more callback notifications to a domain that initiated the request for the particular content item via the user-agent.

12. The method of claim 5, wherein:
the content comprises streaming content hosted by a streaming content hosting service; and
the method further comprises:
  streaming, by the streaming service, the particular streaming content item to the user-agent;
  receiving, by the streaming service from the user-agent, one or more indications of user input to interactive elements of the streaming content; and
  transmitting, by the streaming service, based on the indications of user input from the user-agent, one or more callback notifications a domain that initiated the request for the particular streaming content item from via the user agent.

13. The method of claim 5, wherein:
said setting the security policy in the response comprises setting, by the content hosting service, a content security protocol (CSP) HyperText Transfer Protocol (HTTP) header, based on the security policy; and
the transmitted response comprises the CSP HTTP header.

14. The method of claim 5, further comprising:
receiving, via a configuration interface of the content hosting service, one or more configuration settings for the content item that specify one or more user interface options to be present for display at the user-agent when the content item is delivered;
wherein said transmitting the response comprises delivering the content item according to the one or more configuration settings that specify the user interface options.

15. The method of claim 5, wherein:
said setting the first security policy in the response indicates to the user-agent whether the domain is allowed to embed the particular content; and
said transmitting the first security policy with the response causes the user-agent to determine whether the domain for the first request from the user-agent is allowed to proceed with presenting the particular content item from the content hosting service as embedded content.

16. One or more non-transitory computer-readable storage media comprising program instructions executable on or across one or more processors to perform:
provide, for a content streaming service, a configuration interface for receiving, from multiple different entities, configuration requests that specify different security policies for different streaming content items hosted by the content streaming service, wherein each security policy specifies one or more domains allowed to initiate streaming from the content streaming service for a corresponding streaming content item, and wherein each of the configuration requests specify:
  a particular streaming content item hosted by the content streaming service for the entity, and
  one or more domains allowed to initiate streaming of the particular hosted streaming content item; and
in response to receipt of the configuration requests,
  storing, in a data store for the content streaming service, associations of each of the different streaming content items with the respective domains for the security policy, the data store accessible by the streaming content service to dynamically configure security policies for responses to requests for the hosted streaming content items.

17. The one or more non-transitory computer-readable media of claim 16, wherein:
the content streaming service is an application streaming service that hosts respective applications for the multiple different entities for streaming application content;
the streaming content items comprise the respective applications hosted by the application streaming service;

different security policies are specified for different applications hosted by the application streaming service; and each security policy specifies one or more domains allowed to initiate streaming of application content from the corresponding hosted application.

18. The one or more non-transitory computer-readable media of claim 16, wherein to provide the interface for receiving configuration requests, the program instructions are executable to provide an interface to receive, from multiple different entities, configuration requests that specify different security policies for different types of user-agents that request a same streaming content item.

19. The one or more non-transitory computer-readable media of claim 16, wherein to provide the streaming service interface for receiving configuration requests, the program instructions are executable to:

provide an interface to receive, from multiple different entities, indications of a type of authorization or authentication required for streaming respective ones of the streaming content items; and store each of the indicated types of required authorization or authentication as associated with a respective streaming content item.

20. The one or more non-transitory computer-readable media of claim 16, wherein to provide the streaming service interface for receiving configuration requests, the program instructions are executable to:

provide an interface to receive, from multiple different entities, indications of user interface options associated with streaming respective ones of the streaming content items for display at user-agents requesting the respective streaming content items; and store each of the user interface options as associated with a respective streaming content item.

* * * * *